(12) United States Patent
Sievert et al.

(10) Patent No.: US 11,726,013 B2
(45) Date of Patent: Aug. 15, 2023

(54) PATHOLOGY ASSEMBLY

(71) Applicant: INVEOX GMBH, Garching bei Munich (DE)

(72) Inventors: Maria Sievert, Munich (DE); Dominik Sievert, Munich (DE)

(73) Assignee: INVEOX GMBH, Garching Bei Munchen (DE)

(*) Notice: Subject to any disclaimer, the term of this patent is extended or adjusted under 35 U.S.C. 154(b) by 290 days.

(21) Appl. No.: 16/621,939

(22) PCT Filed: Jun. 19, 2018

(86) PCT No.: PCT/EP2018/066257
§ 371 (c)(1),
(2) Date: Dec. 12, 2019

(87) PCT Pub. No.: WO2018/234307
PCT Pub. Date: Dec. 27, 2018

(65) Prior Publication Data
US 2020/0103320 A1    Apr. 2, 2020

(30) Foreign Application Priority Data

Jun. 19, 2017  (EP) ..................................... 17176690

(51) Int. Cl.
*G01N 1/36* (2006.01)
*G01N 1/31* (2006.01)
*B01L 3/00* (2006.01)

(52) U.S. Cl.
CPC ................ *G01N 1/31* (2013.01); *B01L 3/508* (2013.01); *G01N 1/36* (2013.01);
(Continued)

(58) Field of Classification Search
None
See application file for complete search history.

(56) References Cited

U.S. PATENT DOCUMENTS 5,424,040 A * 6/1995 Bjornsson .......... A61B 10/0096
422/536
5,665,398 A    9/1997 McCormick
(Continued)

FOREIGN PATENT DOCUMENTS

CN    104583384 A    4/2015
CN    106132545 A    11/2016
(Continued)

OTHER PUBLICATIONS

Canadian Examination Report dated Mar. 25, 2021 for Corresponding Canadian Application No. 3,067,673.
(Continued)

*Primary Examiner* — Jyoti Nagpaul
(74) *Attorney, Agent, or Firm* — Tarolli, Sundheim, Covell & Tummino L.L.P.

(57) ABSTRACT

Filter (45) for a pathology assembly (10) comprising a first side (41) that is configured to facilitate the outflow of a fixating, conserving and/or nurturing liquid and/or gas, the first side (41) being configured to withhold at least one specimen, the first side (41) being configured to facilitate recognition and analysis of the specimen, a ridge (46) comprising a filter closing element (26) and a second side (39) opposing the first side (41) comprising a supporting structure (44) and a first member for a first seal (48).

17 Claims, 5 Drawing Sheets

(52) U.S. Cl.
CPC . *B01L 2300/046* (2013.01); *B01L 2300/0681* (2013.01); *G01N 2001/315* (2013.01)

(56) References Cited

U.S. PATENT DOCUMENTS

| | | |
|---|---|---|
| 5,817,032 A | 10/1998 | Williamson, IV |
| 6,017,476 A | 1/2000 | Renshaw |
| 9,097,629 B2 | 8/2015 | Boehl |
| 2003/0059347 A1* | 3/2003 | Ostgaard ............... B01L 3/5453 215/273 |
| 2003/0087423 A1 | 5/2003 | Haywood |
| 2015/0023848 A1 | 1/2015 | Sharma |
| 2016/0153877 A1 | 6/2016 | Holland |

FOREIGN PATENT DOCUMENTS

| | | |
|---|---|---|
| EP | 0471534 A2 | 2/1992 |
| WO | 0019897 A1 | 4/2000 |
| WO | 03031065 A1 | 4/2003 |
| WO | 2010090276 A1 | 8/2010 |
| WO | 2013031421 A1 | 3/2013 |
| WO | 2014109480 A1 | 7/2014 |

OTHER PUBLICATIONS

International Search Report dated Sep. 7, 2018 for corresponding International Application No. PCT/EP2018/066257.
Chinese Office Action dated Oct. 20, 2021 for corresponding CN Application No. 201880041124.0.

\* cited by examiner

PATHOLOGY ASSEMBLY

RELATED APPLICATIONS

The present application is a U.S. National Stage application under 35 USC 371 of PCT Application Serial No. PCT/EP2018/066257, filed on 19 Jun. 2018; which claims priority from EP Patent Application No. 17176690.0, filed 19 Jun. 2017, the entirety of both of which are incorporated herein by reference.

FIELD

The present invention relates to a pathology assembly and method for storing and/or transporting pathology specimen.

BACKGROUND

Specimen or specimens need to be analyzed for various reasons. Various steps for handling such specimens are known in the art.

Modern practitioners transfer a specimen or specimen in general, from the original location to a center, where centralized analyses are possible, not only for the size and the quality of the instruments, but also for the qualification and experience of the analyzing specialists. Thereby, the specimens to be sent to the analytical laboratory should not undergo any change of their condition by autolysis, decay, decomposition and/or disintegration. In the field of food monitoring a pre-enrichment of the sample with a nutritional solution can be desired.

Nowadays, biopsy samples taken from human tissue are extracted and placed into a cavity filled with formalin. This is generally done to maintain the morphological structure of the sample tissue. The sample can then be placed into a prepared envelope and shipped to the histological laboratory for further processing, such as the section preparation, curetting, fixation and grossing etc.

Specimens received for histological examination may come from a number of different sources. They range from very large specimens or whole organs to tiny fragments of tissue. For example, the following are some of the specimen-types commonly received in a histopathology lab. Excision specimens also called surgical biopsies, where whole organs or affected areas are removed. Furthermore, incisional biopsy specimens are to be analyzed, where tissue is removed for diagnosis from within an affected area, punch biopsies, where punches are used to remove a small piece of suspicious tissue for examination, shave biopsies, where small fragments of tissue are "shaved" from a surface (usually skin), curetting, where tissue is removed in small pieces from the lining of the uterus or cervix by a curette. This is a surgical instrument for removing dead tissue, growths, etc., from the walls of certain body cavities, core biopsies, where a small specimen is percutaneously removed using a special needle sometimes through the skin.

Histology specimen or histology specimens can further derive from livestock farming, veterinary, scientific laboratory, botanic, agricultural, forestry, maritime etc. Clinical studies can require an efficient, safe and traceable handling, that can further be an automated handling.

Specimens are usually received in fixative or preservative but sometimes arrive untreated and must be immediately fixed. Before specimens are accepted by a laboratory, the identification or labelling and accompanying documentation will be carefully checked, all details recorded and specimen tracking commenced. It is vital that patient or research specimens are properly identified and the risk of wrong results minimized.

Fixation of the sample at the beginning of the process can be a step in preparing specimens for microscopic examination. It's objective is to prevent decay and preserve cells and tissues in an analyzable state. It does this by stopping enzyme activity, killing microorganisms and hardening the specimen while maintaining sufficient of the molecular structure to enable appropriate staining methods to be applied at the time of analysis, comprising those involving antigen-antibody reactions and those depending on preserving DNA and RNA. The sooner fixation is initiated following separation of a specimen from its blood supply the better the result can be. The most popular fixing agent is formaldehyde, usually in the form of a phosphate-buffered solution in general referred to as formalin. Ideally specimens should be fixed by immersion in formalin for six to twelve hours before they are processed.

Specimen cell structures may be stained to improve analysis results.

A further step in handling such a specimen is grossing, often referred to as cut-up, involves a careful examination and description of the specimen that will include the appearance, the number of pieces and their dimensions. Larger specimens may require further dissection to produce representative pieces from appropriate areas. For example, multiple samples may be taken from the excision margins of a tumor to ensure that the tumor has been completely removed. In the case of small specimens, the entire specimen may be processed. The tissues selected for processing will be placed in cassettes in the form of small and perforated baskets and batches will be attached onto a tissue processor for processing by wax.

Practitioners in this field have disclosed a variety of inventions. For example, WO 2014 109480 A1 discloses an embedding cassette for a biopsy, and the embedding cassette for forming, in an embedding mold, a space capable of accommodating tissue therein when the embedding cassette is coupled to the embedding mold and for embedding the tissue accommodated in the embedding mold in a state where the embedding cassette is coupled to the embedding mold, comprises: a body having a space which is connected to the accommodation space of the coupled embedding mold and in which an injected paraffin solution can be solidified when carrying out embedding work; and at least one paraffin partition groove formed on the edge of the lower surface of the body, wherein when the embedding work is carried out by being coupled to the embedding mold, the injected paraffin solution forms a partition by flowing into the at least one paraffin partition groove, thereby preventing the paraffin solution from flowing out through the embedding mold.

US 2016 153877 A1 claims a tissue specimen handling device comprising a tissue processing cassette, which relates to a tissue processing cassette for processing small tissue specimens. The processing cassette includes a base frame and a lid frame, each including a central opening and a face adapted to abut the face of the other in registered relationship in a closed position. A porous screen spans the central opening of each of the base frame and the lid frame. The screens are spaced apart when the cassette is closed, whereby the base frame, the lid frame, and the screens define an enclosed area for holding a tissue specimen during preparation for histological examination. The porous screen permits processing fluids to flow through the enclosure, but resists entry of particulate contaminants into the enclosure, and also resists outflow of small tissue specimens from the enclosure during processing.

US 2015 023 848 A1 describes a biopsy processing system designed to prevent lodging and possible loss of the tissue specimen for analysis. The system includes a biopsy container having a longitudinal wall forming an internal compartment, a biopsy bag attached to an inner surface of the container, a cassette for receiving the biopsy bag, and an automated system for removing the biopsy bag from the biopsy container and placing the biopsy bag in the cassette.

WO 2010 090 276 A1 provides a cassette, the bottom face of which can easily be opened and closed. A cassette houses substrate. The cassette is equipped with: a cassette main body within which substrates are disposed; a cassette opening that is formed on a side of the cassette main body and through which the substrates are introduced and withdrawn; a bottom face opening formed on the bottom face of the cassette main body; a bottom plate that seals the bottom face opening; and bottom plate supports that support the bottom plate and are provided on the inner walls of the cassette main body.

WO 2013 031 421 A1 discloses an embedding tray for producing an embedding block in which a specimen is embedded in an embedding agent while the embedding block is affixed to the bottom surface of an embedding cassette, and is provided with: a bottomed cylindrical tray body that has a recessed portion in which the specimen is housed and the melted embedding agent can be poured, and has an upper surface on which the embedding cassette is mounted; and a contact body that is provided on the upper surface of the tray body and is in contact with at least one side surface of the mounted embedding cassette. The embedding tray is formed from a rubber material.

U.S. Pat. No. 5,424,040 A explains a surgical pathological specimen kit with cassette. The kit includes a surgical cassette for receiving a pathological specimen, a conical guide for guiding the specimen into the cassette, a cylindrical container to house the cassette and conical guide, and a lid to close the cylindrical container and seal the cassette and conical guide from the exterior. The cassette has a permeable concave membrane which eliminates mechanical handling and increases tissue yield for microscopic examination. A bar code tracking or audit system is used to facilitate identification, tracking and storage of specimens and cassettes.

EP 0 471 534 A2 is directed to a stackable cassette and apparatus for preparation of multiple tissue specimens for histological examination. The cassettes include a bottom wall, two side walls, a front wall and a back wall which define a cavity. The bottom wall has a plurality of apertures disposed therein for passage of fluid through the cassette in a direction orthogonal to the plane of the bottom wall. At least two walls selected from the back wall, two side walls and front wall have a plurality of apertures disposed therein for passage of fluid through the cassette in the direction parallel to the plane of the bottom wall. In one embodiment of the invention, the cassette further includes a web of porous material disposed over the apertures in the bottom wall and side walls. When the cassettes are placed in stacked relationship the bottom wall of an overlying cassette provides a cover for the underlying cassette.

U.S. Pat. No. 5,665,398 A is directed to a system for providing an embedded tissue specimen subsequent to fluid treatment of the specimen and preparatory to histological examination. The system includes the combination of a cassette for use in the preparation of tissue specimens for histological examination and an embedding mold having a first cavity for receiving the treated specimen and a second cavity for receiving the cassette. The system includes means for dispensing a predetermined amount of molten wax into the embedding mold.

U.S. Pat. No. 6,017,476 A describes a specimen processing method and cassette utilizes an open-topped, perforated collection cradle and a flat, perforated embedding pedestal which snap together in a male/female relationship to enclose and orient a specimen during chemical processing. After chemical processing, the embedding pedestal enables a specimen to be embedded in exactly the same plane as the cutting plane of a microtome during sectioning. This minimizes the number of sections required for histologic evaluation and eliminates the need for mechanical handling of the tissue specimen after its initial collection.

U.S. Pat. No. 9,097,629 B2 discloses an apparatus for holding a tissue sample having a retaining member with a first tissue engaging surface and at least one biasing element. The first tissue engaging surface is moveably attached to the retaining member. The apparatus also has a base comprising a second tissue engaging surface which is configured to engage the retaining member to form an interior area with the first and second tissue engaging surfaces facing each other. The apparatus also has a retracting member connected to the retaining member which is configured to retract the first tissue engaging surface and compress the biasing element to form a gap between the tissue sample and one of the first tissue engaging surface and the second tissue engaging surface.

All of the above-mentioned publications are herewith incorporated by reference.

SUMMARY

It is an object of the present invention to provide a better and/or alternative device for handing at least one pathology assembly.

This object is attained with the subject matter according to the respective claims.

Most if not all of the above described pathology containers are intended for the use of the device in a manual manner. This manual handling at the practitioners' side usually comprises the opening of the container, applying the specimen into the container and add a liquid and/or gas into the container prior to closing it. The appropriate liquid and/or gas can be prefilled.

This liquid can be formalin or any derivate providing comparable parameters. Formalin is a liquid known to be cancerogenic and/or mutagenic; thus, handling such a liquid comprises the risk of touching it unwillingly.

It should anyhow be understood that other liquids than a liquid for conserving a specimen can be applied. The liquid can comprise the use of fixating or nurture the specimen. Even the lack of a liquid is covered by this invention. Such a specimen could be an agricultural sample such as seed, soil, bark, a leave and many other samples.

Further, a gas can be applied to, such as an inerting media. Additionally, or alternatively, also oxygen or environmental air can be comprised.

Many errors can occur due to routine procedures that are continuously repeated by qualified personal.

The invention in the following can reduce the qualified persons from the necessity to carry out monotonous steps over and over again and thus can increase the throughput and decrease the costs considerably and further reduce error probability.

The invention can comprise a filter that can comprise a first side which can also be addressed as an inner side or as directed to the inner part of the container when assembled. This first side can be configured to facilitate the outflow of a fixating, conserving and/or nurturing liquid. Further the first side of the filter can be configured strong enough to withhold a specimen and provide a structure strong enough to offer a stable rest for the specimen. Further, a later to be carried out microtome precision cut can apply a mechanical load to the specimen and thus to the filter where the specimen can rest in.

The first side of the filter can be substantially shallow enough to provide accessibility and a clear view onto the specimen resting here to provide recognition and analysis of the specimen.

The filter can comprise a ridge. The ridge can accommodate a filter closing element. The ridge can be understood to be an element substantially raised over the surface and/or support of the filter.

The filter can further comprise a second side that can rest on a supporting structure and can further comprise a first member of a first seal. The second side of the filter can alternatively be addressed as the lower or the outer side of the filter. The seal can be assembled to enable an at least liquid tight connection between the assembly comprising the filter and the container lid versus the container.

The first side of the filter can provide an improved configuration to allow automated specimen recognition and a description of the specimen. The at least one pore to enable outflow of liquid can have a clearance of at least 1 μm, preferably at least 10 μm, more preferably at least 500 μm and at most 5 mm, preferably at most 3 mm, more preferably at most 1 mm and most preferably between 10 μm and 1 mm. Various shapes of the pores can be provided, as round, square and/or slotted holes, where the clearance can be known as diameter. One or a plurality of elongated holes can be considered and/or irregularly shaped holes, as long as they provide sufficient mechanical stability to hold the specimen and the liquid can flow out from the first side of the filter.

To further strengthen the mechanical stability, the first side of the filter can comprise at least one rib. This at least one rib can further optimize the outflow of the fixating, conserving and/or nurturing liquid. The shape of the inner side of the filter can be substantially concave. A rib is to be understood as a strengthened portion if the filter. It can have various shapes, such as radial, concentric, parallel, irregular or any combination thereof.

The closing element of the filter can be formed as a positively engaging element, such as a thread and/or a bayonet; however, other engaging elements are possible, as a frictional engagement would constitute. Further, the ridge can form a first member of a second seal configured to form a connection with a container. This connection can be configured to be liquid tight.

The first side of the filter can comprise a section being non-perpendicular towards the ridge. A range of angles between 90° and 180° is considerable, preferably at least 120°, more preferably at least 140° and at most 180°, preferably at most 130°, most preferably forming a substantially rounded and/or a chamfered surface. Other shapes can be considered as could be a truncated cone, a hyperbolic shape and/or any other applicable shape.

The filter can be fitted with an identifier that can comprise human and/or machine-readable information. The information can be a numeric, an alphanumeric or sequence of letters, or combinations thereof. Further, symbolic patterns can be applied to permit a user to identify the specimen, the source of the specimen, any hazard information, a procedural information to determine the further steps to be taken and similar information.

The information can comprise an RFID chip that is integrated in the injection molded filter piece, but can also comprise a barcode, a QR code or digits that can be read by an optical or other electronic device to be further stored, conveyed to a laboratory information system or similar.

A closing element of the filter can be engaged releasably with the container. One embodiment could make use of a thread mechanism, another embodiment could make use of a bayonet embodiment, while it should be understood that further embodiments are considerably, as long as they provide a firm but releasable connection between the filter and the container.

The supportive structure of the filter can comprise a support rib to provide a stable structure to the filter and/or provide a convenient mode for a person to handle the device.

The closing element of the filter can not only be engaged to the container but can also provide a positive and/or frictional locking engagement, preferably pressed into a frame.

The filter can releasably be attached to a container lid, preferably machine-releasably in a manner that it is cumbersome for a human to separate the assembly comprising the filter and the container lid.

This attachment of the filter to the container lid may be carried out in a firm and tamper resistant manner. To ensure a firm and tamper resistant connection between filter and container lid, the container lid can comprise locking clips. These locking clips can be configured in a way they tightly stick to the filter. The locking clips can be configured to prevent a person to release the clip, preferably a machine carries out the step to unleash the connection between the filter and the container lid. At least one locking clip can be provided, preferably at least 3 locking clips, more preferably at least 4 locking clips. It should be understood that even a higher number can be provided, up to an indefinite number, as long as the connection between the filter and the container lid is firm and tamper resistant.

The container lid can comprise a second member of a first seal to form a connection to the filter. It should be understood that a firm abutment between the filter and the container lid can be provided.

The container lid can comprise at least one engagement element controllable by an automated decapping device. More engagement elements can be provided, at least 2 engagement elements, more preferably 3 engagement elements, most preferable 4 engagement elements. However, even a higher number may be provided, as long as it provides a firm and tamper resistant connection is ensured. Any further embodiments of engagement elements can be provided, like ripples, and/or any known locking or closing element, provided an at least liquid tight connection can be achieved.

Further, the container lid can comprise distance-rib to ensure a defined distance between the container and its lid. Further, the container lid may comprise a centering means, such as centering ribs or sloped provisions to ensure a defined relational location between the container and its container lid.

The container configured to connect to the filter can comprise at least one cavity to receive and/or hold a specimen. A liquid for various applications can be comprised. Such a liquid may be a fixating, a nurturing and/or a conserving liquid. It should be clear that the liquid is an option; in case no liquid is needed, it can be omitted without having an effect on the invention.

To further improve the handling capability of the container during the dismantling and production process, a gripping range can be comprised. A variety of gripping range embodiments can be provided, such as an at least 3-edged shape, an at least 4 edge shape, more preferably at least a 5-edge shape, most preferably a 6-edge shape. However, it should be understood that a higher amount of edges is comprised as long as a firm grip can be provided for an automated handling process. Although a regular and evenly distributed shape is preferred, an unevenly distributed shape can be provided.

Other than an external n-edged shape, any other embodiment can be provided, as could be an internal n-edge with a round outer surface, an n-edged or n-legged asterisk, be this shape internal and/or external.

Various shapes of a gripping range can be applied, such as one or more score(s), oval configuration, rounded edges, evenly distributed or irregularly.

The container can comprise a second member of the second seal and form a connection between the filter and the container.

The container may comprise at least one defined region configured to hold at least one information field for identification and/or automation purposes. Preferably, one of the defined regions may be the bottom of the container and/or the other on the side surface of the container. The information field within the defined region may be any machine-readable code, which can comprise a data matrix code, a barcode, a QR code, a standardized font set like OCR-A and/or a human readable information. The information field may comprise a unique registration number of the container which can be correlated to a specimen. Such a number should be understood to also comprise alphabetical, alpha-numeric, symbolic patterns or a combination thereof.

The container can also comprise at least one defined region where an electronically readable information is coded in an RFID chip and/or another information source which is readable by an electronic device. Further, a machine writable media can be supplied.

A machine writable information carrier can be one of the RFID and/or NFC tags. However, even a laser and/or an ink-jet could write to a defined area of the container. Further, at least one sticker may be applied or at least one factory-set identification code.

The frame which is configured to connect to a filter can comprise a closure substantially complementary to the filter closing element.

The frame can further comprise a provision to connect or a frame lid either by a hinge knuckle/hinge pin combination or by a living joint connection between the frame and the frame lid. To further enable a reliable coupling of the frame with the frame lid, a slot can be comprised substantially complementary to the locking clip of the frame lid.

The frame lid which can be connected to the filter can comprise pores or a clearance of at least 1 μm, preferably at least 10 μm, more preferably at least 500 μm and at most 5 mm, preferably at most 3 mm, more preferably at most 1 mm and most preferably between 10 μm and 1 mm. Various shapes of the pores can be considered, as substantially round holes, where the clearance can be known as diameter. One or a plurality of elongated holes can be considered and/or irregularly shaped holes.

A container assembly can be used for storing and/or transporting at least one specimen. The container assembly can comprise the filter, the container lid and the container lid. The container lid and/or the filter can be connected to the container in an at least liquid tight manner. It may be noted that it is important for the assembly comprising the container, the filter and the container lid that an at least liquid tight connection is achieved.

The container assembly can comprise an identifier that can be human and/or machine readable. Further, a machine writable media can be supplied.

A machine writable information carrier can be at least one of the RFID or NFC tags. However, even a laser could write to a defined area of the container assembly. Further, at least one sticker may be applied or at least one factory-set identification code.

The biopsy cassette can be intended to handle and/or store the at least one specimen. The biopsy cassette can comprise the filter, the frame and the frame lid. Further to the above-mentioned machine-readable coding on the container, an additional and/or alternative identification can be comprised in or on the frame and/or the filter. The identification may be a machine-readable information source, preferably an RFID or NFC chip, a data matrix coded, a QR-coded information and/or a barcoded information. Further, a machine writable media can be supplied.

A machine writable information carrier can be one of the RFID or NFC tags. However, even a laser could write to a defined area of the biopsy cassette. Further, at least one sticker may be applied or at least one factory-set identification code.

The pathology assembly as a whole can comprise the container assembly and/or the biopsy cassette.

In the following the corresponding methods are described for the preferred way how the pathology assembly can be handled.

The container assembly can be readily pre-assembled at factory stage. The container, which can be filled with the fixating, conserving and/or nurturing liquid, is closed with an assembly comprising the filter and the container lid.

The practitioner can open the container assembly removing the assembly comprising the filter and the container lid, places the specimen into the cavity of the container and closes the container assembly respectively.

The connection of the filter to the container lid, in the following named the lid assembly, can be assumed to be pre-produced before the pathology assembly is delivered to the pathology laboratory. However, it should be understood that this pre-production is not mandatory. Once the practitioner has placed his specimen to be analyzed into the cavity of the container, has added the fixating, conserving and/or nurturing liquid, the lid assembly can be engaged to the container, then forming the container assembly. The fixating, conserving and/or nurturing liquid can further be applied at any stage earlier.

The container assembly can then be assumed to be conveyed to a pathology laboratory. The process in the pathology laboratory focusses on a substantially automated process as follows.

The container assembly can be identified by reading the information stored on one or more defined region(s). Further, the container lid can be decapped, such that the container and the filter remain. After that the handling provides a steady motion to pour out the liquid in the container. The filter can be constructed to permit the outflow of the liquid whereas the specimen is held back by the ribs and the assembly comprising the container and the filter is positioned in a way the filter is below the container and the specimen can be assumed to rest in the filter portion of the assembly. The container portion of this assembly can now be released from the filter. The engagement element can in the form of a thread. However, a bayonet closure and/or a frictional element can be provided. The engagement element of the container can be configured to be complementary to the engagement element of the filter.

A further method assembles the biopsy cassette by engaging the filter into the frame, preferably by pressing the frame into the frame which accommodates the specimen.

Later, the frame lid can be closed, such forming the biopsy cassette as a whole. The specimen can rest within the biopsy cassette.

The words "specimen" and "specimens" are used interchangeably and have the identical meaning, unless specifically distinguished the singular or the plural form.

The words "pathology" and its derivates shall be understood interchangeably with "histology" and its derivates.

The tissue sample may originate from human, animal, botanic, agronomical, forestry, food and/or forensic samples.

The word "membrane" comprises at least one sheath, mesh, grid, film, lamina and/or covering layer and/or any combination thereof.

The expression "tissue" is meant to comprise all material to be analyzed at another location than where it is gained from. Tissue comprises for instance human and/or animal specimen but also verdure sample gained from, for instance, food control or agricultural survey.

Wherein "steps" are mentioned in this invention, the sequence of these steps is meant to be various, i.e., for instance, a latter step can also be carried out before a preceding step without colliding with the subject of the invention.

BRIEF DESCRIPTION OF THE FIGURES

FIG. 1a to FIG. 1e depict an embodiment of the pathology assembly according to the invention with the elements filter, container lid, container, frame and frame lid.

Figure 1:
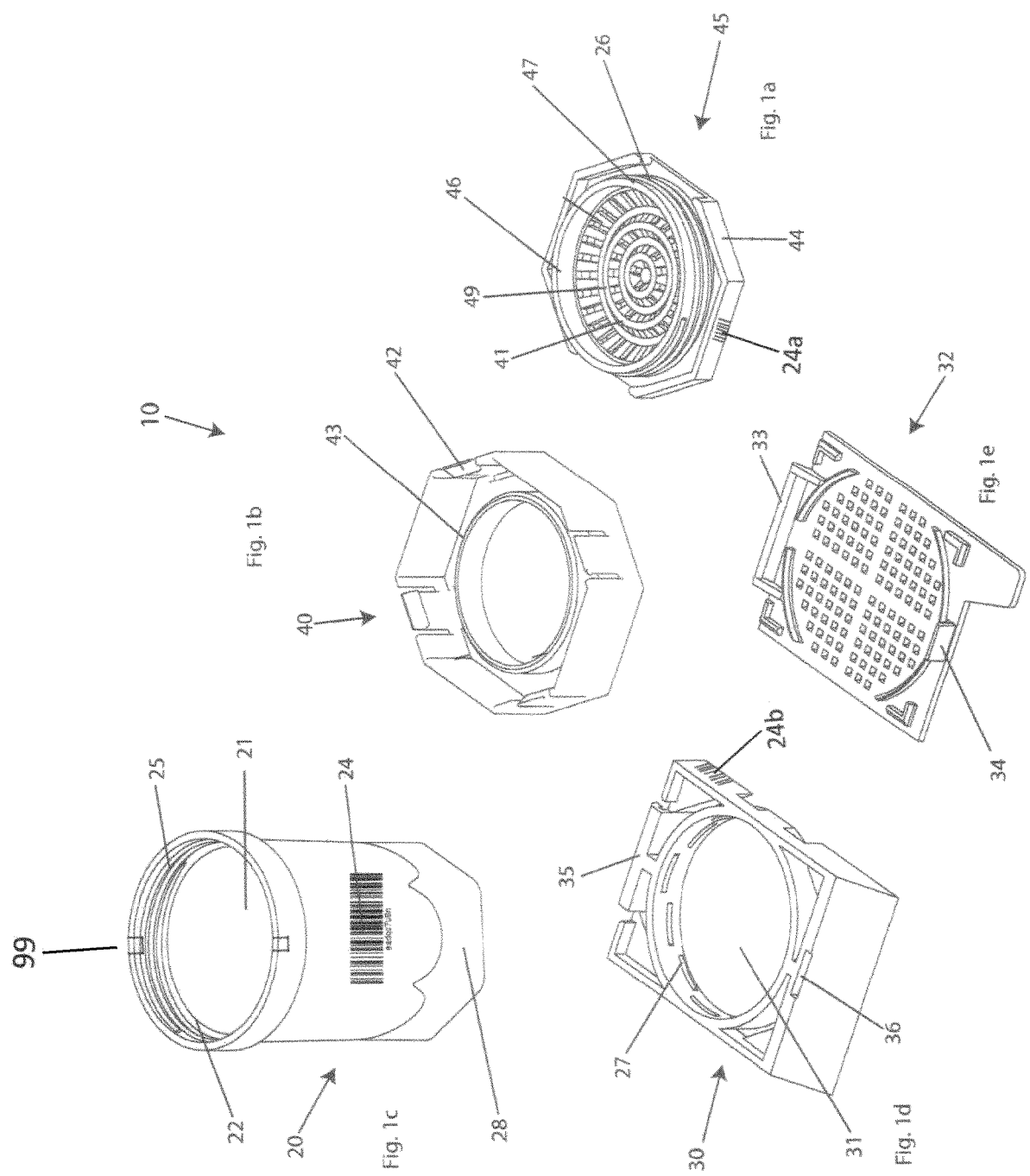
FIG. 1 comprising

The elements comprising the container, the container lid and the filter can form a container assembly.

The elements comprising the frame, the frame lid and the filter may form a biopsy cassette.

The elements comprising the container, the frame, the frame lid, the container lid and the filter can form a pathology assembly.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps. Any features described and claimed in connection with the device claims are also applicable to the method claims and to be understood as respective method steps and vice versa.

The term "and/or" intends to embrace each alternative alone or any kind of combination of the alternatives listed. An "and/or" before the last member of a list of alternatives is to be understood to as being in-between each of the members of the list.

As used herein, including in the claims, singular forms of terms are to be construed as also including the plural form and vice versa, unless the context indicates otherwise. Thus, it should be noted that as used herein, the singular forms "a", "an" and "the" include plural references unless the context clearly dictates otherwise.

Throughout the description and claims, the terms "comprise", "including", "having", and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The same reference numerals used for different embodiments are intended to identify parts or features of different embodiments with the same or similar function. In case the same reference numerals are not identified in other embodiments, this is by no means intended to mean that the corresponding features designated by these reference numerals are not present.

One preferred embodiment forms a cavity eligible to center the sample to prevent it sticking to one of the walls or even in a corner.

DESCRIPTION OF THE FIGURES

FIG. 1a depicts the filter 45 that can comprise a supporting structure 44 which can provide the possibility to conveniently open and/or close an assembly comprising the filter 45 and the container lid (depicted in FIG. 1b) from and to the container (depicted in FIG. 1c). A filter closing element 26 can be formed as a positively engaging element. A ridge 46 with a second sealing member 47 can be configured to abut with the container (depicted in FIG. 1c). Ribs 49 on the first side 41 can be considered to be complementary to the ribs on the second side (depicted in FIG. 3). Further, a field carrying an identifier 24a can be supplied. This identifier 24a can be integrated into the filter visibly or invisibly, such like a RFID tag or an NFC tag. The identifier 24a can either be a read only, a write once—read multiply or a write/read multiply device. Depicted as the identifier 24a is a laser burned bar code to illustrate this feature.

Further embodiments of filter 45 are described in separate figures.

FIG. 1b depicts the container lid 40 with the second member of the first seal 43. This seal 43 can complementarily form a liquid tight connection to the first member of the first seal (depicted in FIG. 1a). Clips 42 can be provided to firmly and tamper resistant engage to the filter (depicted in FIG. 1a). These clips 42 can be configured to engage with the supporting structure depicted in FIG. 1a. At least one clip, also to be addressed as a claw or clamp, can be provided, however at least 2 clips 42, more preferably 3, most preferably at least 4 clips 42 can be supplied. Even a higher number of clips 42 can be provided. The clips 42 can also be addressed as latches.

Figure 4A:
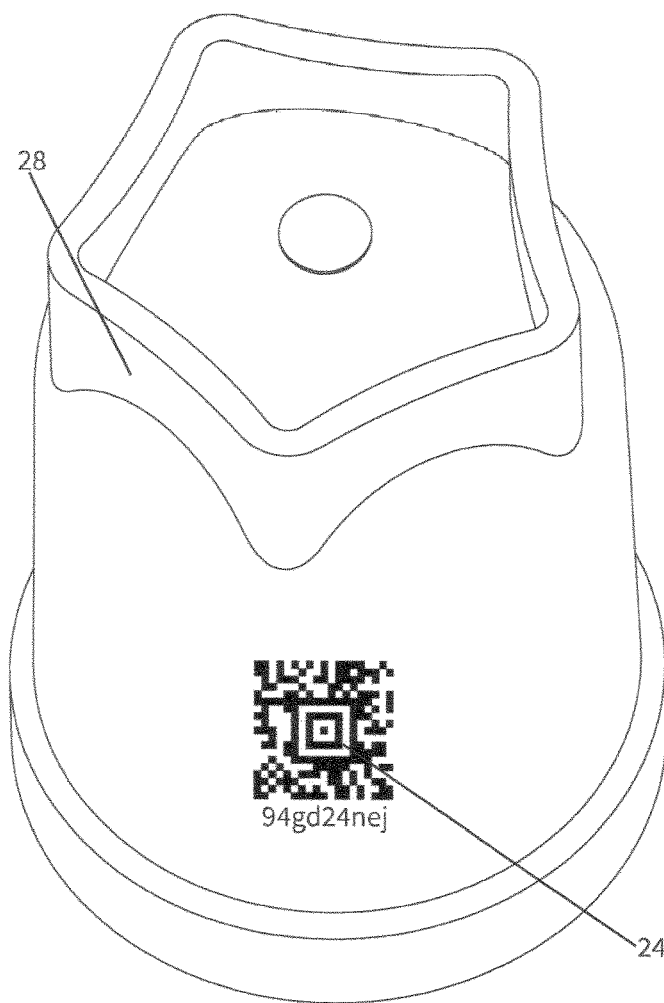
FIG. 4a and FIG. 4b depict the gripping range of the container in a detailed view.
Figure 4B:
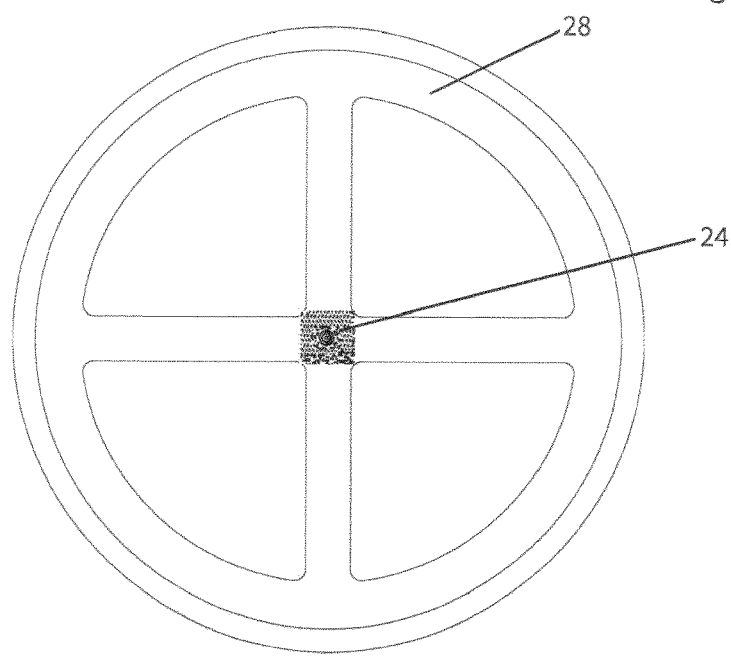

FIG. 1c depicts the container 20. The container 20 is configured to connect to the filter (see FIG. 1a) and can comprise at least one cavity 21 to receive and/or hold a specimen (not shown). A liquid or a gas for various use can be added. Such a liquid may be a fixating, a nurturing and/or a conserving liquid. The gas can be any gas including ambient air. Thus, an embodiment without a liquid may be applicable in cases where no liquid is needed. To improve the handling capability of the container 20 during the dismantling and/or the production process, a gripping range 28 can be comprised. Here a hexagonal shape is depicted, however, any shape can be applied as long as it supports a machine-driven handling and holding of the container 20. FIGS. 4a and 4b show embodiments of a gripping range 28. Further an at least 3-edged shape, an at least 4 edge shape, more preferably an at least a 5-edge shape, most preferably a 6-edge shape can be provided. More edges for the gripping range 28 are disclosed in this invention. A firm grip can be provided for an automated handling process. Although a regular and evenly distributed shape is preferred, an unevenly distributed shape can be provided. Other than an external n-edged shape, any other embodiment can be provided, as could be an internal n-edge (see FIG. 4b) with a substantially round outer surface, an n-edged asterisk, be this shape internal and/or external. The container 20 can comprise a second member of the second seal 22 and form an at least liquid tight connection to the filter (depicted in FIG. 1a). The container 20 may comprise at least one defined region 24 configured to hold at least one information field for identification and/or automation purposes. Preferably, one of the defined regions may be the bottom of the container (see FIG. 5a), the other on the side surface of the container 20. The information field within the defined region 24 may be any human and/or machine-readable code, which can comprise a matrix data code, a barcode, a QR code, a standardized font set like OCR and/or a human readable information. The information field may comprise a unique registration identifier of the container 20 which can later be correlated to a specimen. Further, the information field 24 may comprise information about the type of specimen and/or of a reference for billing and/or identification purposes. Engagement element 25 is depicted here in the form of a thread. However, a bayonet closure and/or a frictional element can be provided. The engagement element 25 can be configured to be complementary to the engagement element 26 (see FIG. 2).

FIG. 1d depicts a frame 30 to accommodate the filter (see FIG. 1a) after the filter has mechanically been dismantled from the container lid (see FIG. 1b) and the container (see FIG. 1c). The recess 31 can be configured to complementarily accommodate the engagement element 26 of the filter 45 (see FIG. 1a). Hinge knuckle 35 and the slot 36 depicted here can be considered substantially complementary to the frame lid (see FIG. 1e) to abut with. Engagement element 27 can be configured to be complementary to the engagement element 26 of the filter 45 (see FIG. 1a and FIG. 2). Further, an identifier 24b may be supplied, either at a specific location, or invisibly integrated into the frame as a RFID tag or an NFC tag. If visible, an identifier can be written onto the frame, by a laser for example. Further, at least one sticker may be applied or at least one factory-set identification code.

FIG. 1e depicts the frame lid 32 to provide a closure of the assembly comprising the frame 30 with the filter 45 (see FIG. 1a). The hinge pin 33 and the locking clip 34 can be configured to complementarily be engaged to the hinge knuckle 35 and the slot 36 from the frame 30 (see FIG. 1d). Further, any alternative form of engagement can be used, such as a clip-in set 33 with a slot (see FIG. 1d).

Figure 2:
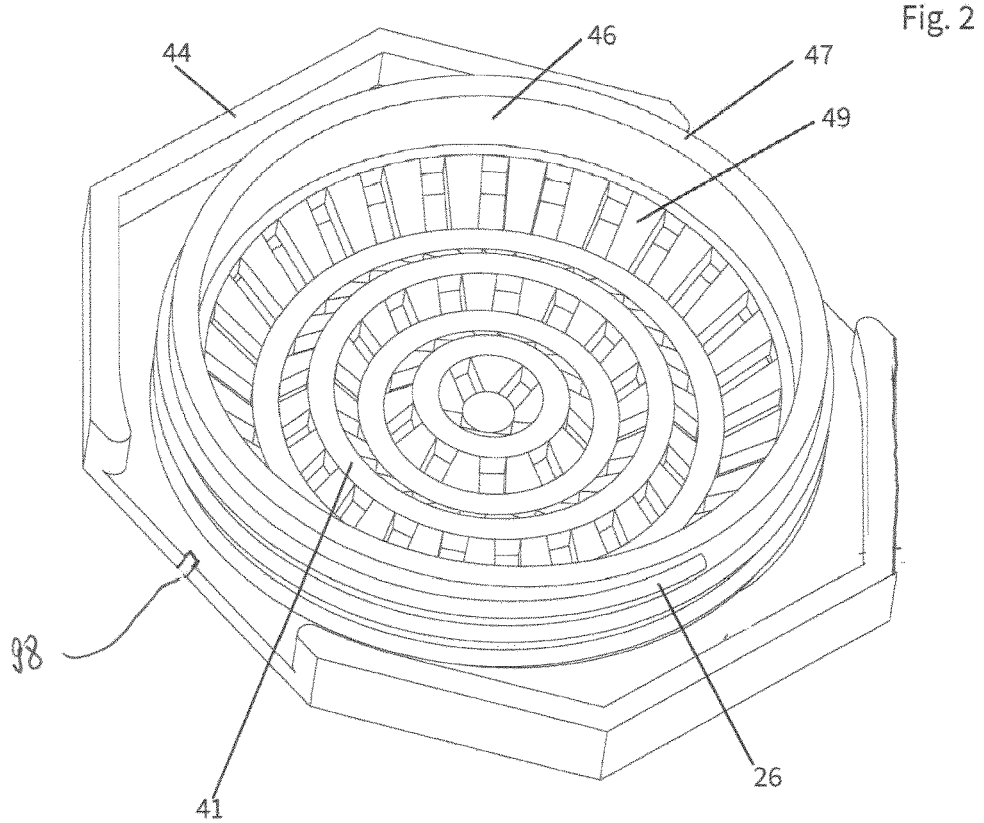
FIG. 2 depicts the filter as seen from the first side in a perspective aspect.

FIG. 2 depicts a detailed aspect of the first side 41 of the filter 45, the first side 41 also to be addressed as the upper side or the inner side of the filter 45. The filter 45 can also be addressed as a strainer or a sieve. The first side 41 of the filter 45 can comprise at least one pore configured to enable liquid outflow, wherein a pore or clearance is at least 1 μm, preferably at least 10 μm, more preferably at least 500 μm and at most 5 mm, preferably at most 3 mm, more preferably at most 1 mm and most preferably between 10 μm and 1 mm. Ribs 49 to support the specimen and/or to ease outflow of the fixating, conserving and/or nurturing liquid can be supplied. A filter closing element 26 is formed as a positively engaging element, such as a thread and/or a bayonet, and the ridge 46 comprises a first member for a second seal 47 configured to form a connection with a container 20 (see FIG. 1c) and/or with the engagement element 27 (see FIG. 1d) complementarily. The support 44, also addressed as support structure or supporting structure, can be configured to enable a convenient handling by the practitioner and also provide sufficient mechanical stability in case the filter is handled by a machine. Further, the supporting structure 44 can be utilized to interact with the clamps 42 (see FIG. 1b). The shape of the inner structure of the filter 45 may comprise a section being non-perpendicular towards the ridge; to enable the liquid to be poured out substantially concentric to the filter, further embodiments can be provided, like a truncated cone. Further, a snap-in recess (98) can be provided to ensure firm abutment with the container lid (see FIG. 1b).

Figure 3:
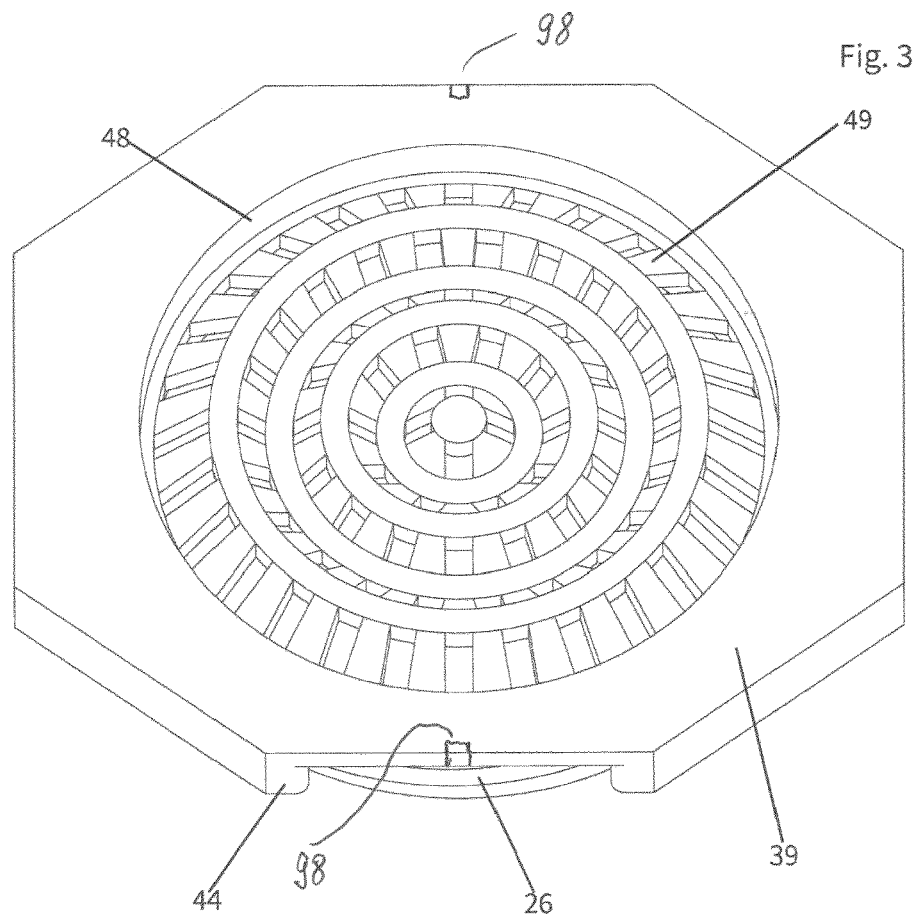
FIG. 3 depicts the filter as seen from the second side in a perspective aspect.

FIG. 3 depicts a detailed aspect of the second side 39 of the filter 45, the second side 39 also to be addressed as the lower side or the outer side of the filter 45. The filter 45 can further be addressed as a strainer or a sieve. The ribs 49 and the pores or decreases can also be seen from the outer side

39. The supporting structure 44 can be seen from the bottom. Further, a part of the filter closure 26 is depicted, described in more detail in FIG. 2. The first member of a first seal 48 can be configured to interact at least liquid tight with the second member of the first seal 43, as depicted in FIG. 1b. Further, a snap-in recess (98) can be provided to ensure firm abutment with the container lid (see FIG. 1b).

FIG. 4a depicts a detailed aspect of an alternative embodiment of the gripping range 28. A 5-edged gripping range 28 with rounded edges and uneven engagement sides can be provided. Further, the location of a defined region 24 is depicted, here represented as a QR-code.

FIG. 4b depicts a further example of the gripping range 28. The defined region 24 holding an information field in an embodiment where it is located at the bottom of the container.

Figure 5A:
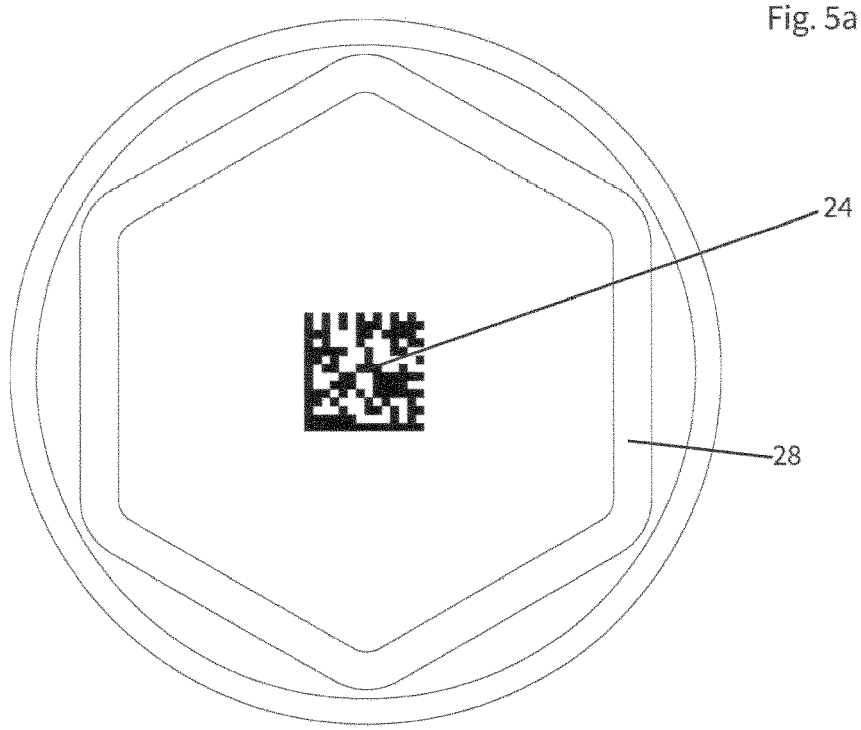
FIG. 5a and FIG. 5b depict the data field of the container in an enlarged aspect.
Figure 5B:
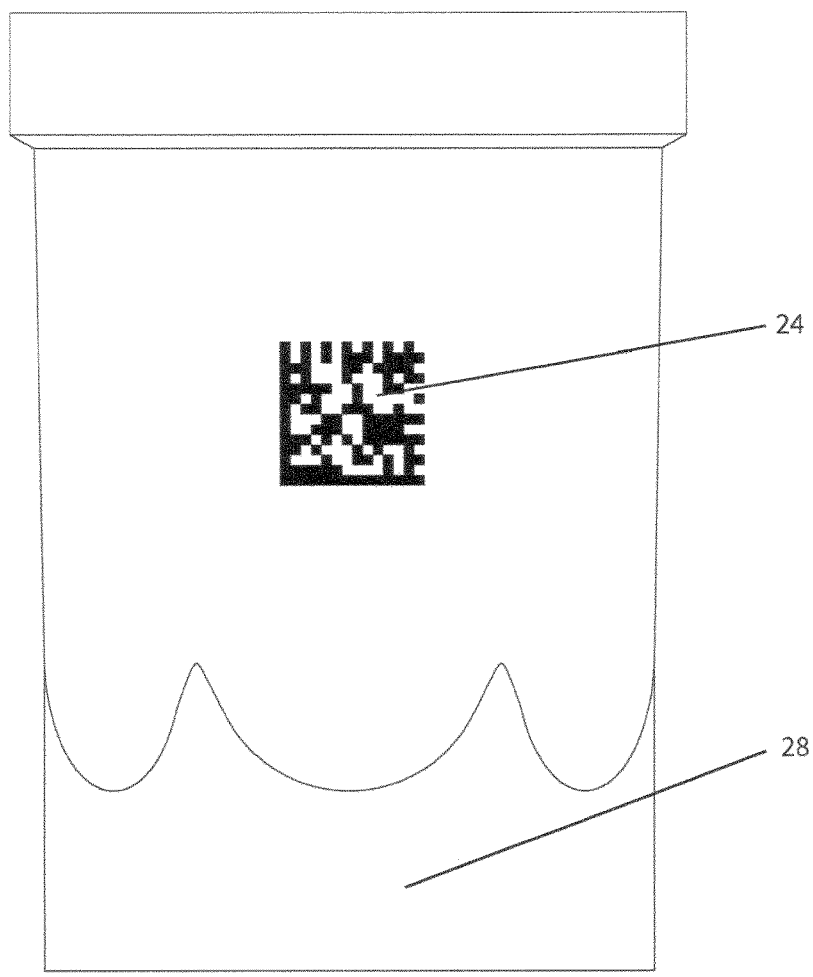

FIG. 5a and FIG. 5b depict a detailed aspect of the defined region 24 comprising a code to identify the individual pathology assembly 10 and/or the container assembly 15.

Figure 6A:
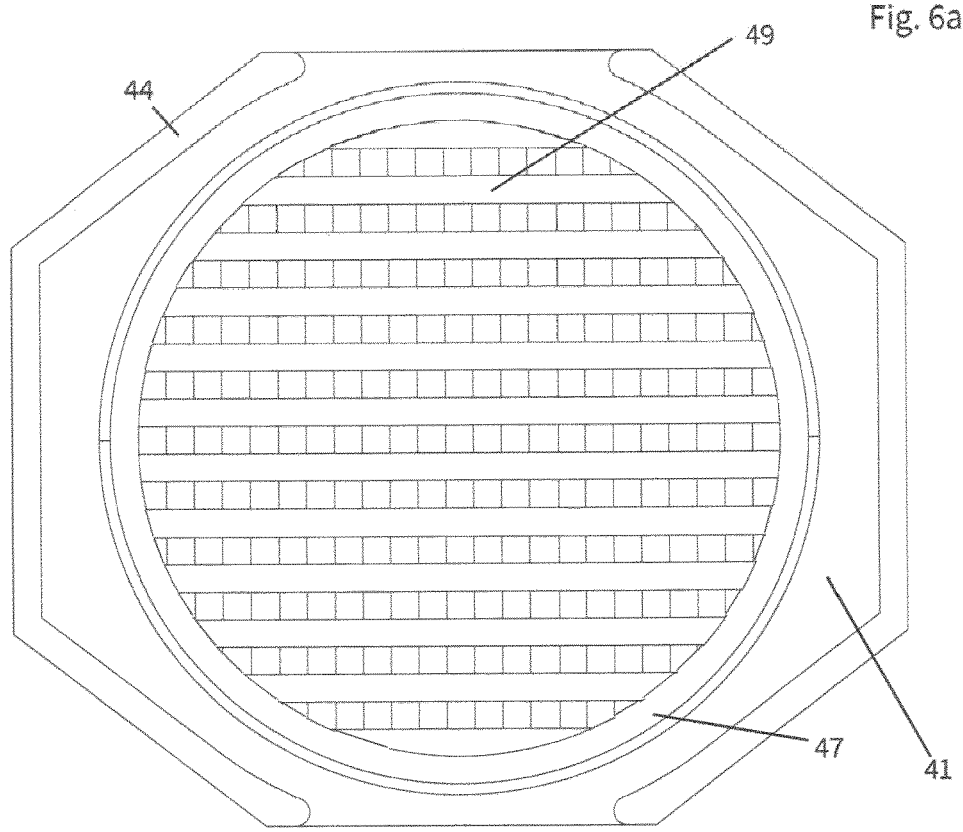
FIG. 6a and FIG. 6b depict alternative embodiments of the filter.

FIG. 6a depicts a further embodiment of the filter 45 in a ground plane. The ribs 49 are positioned substantially parallel.

Figure 6B:
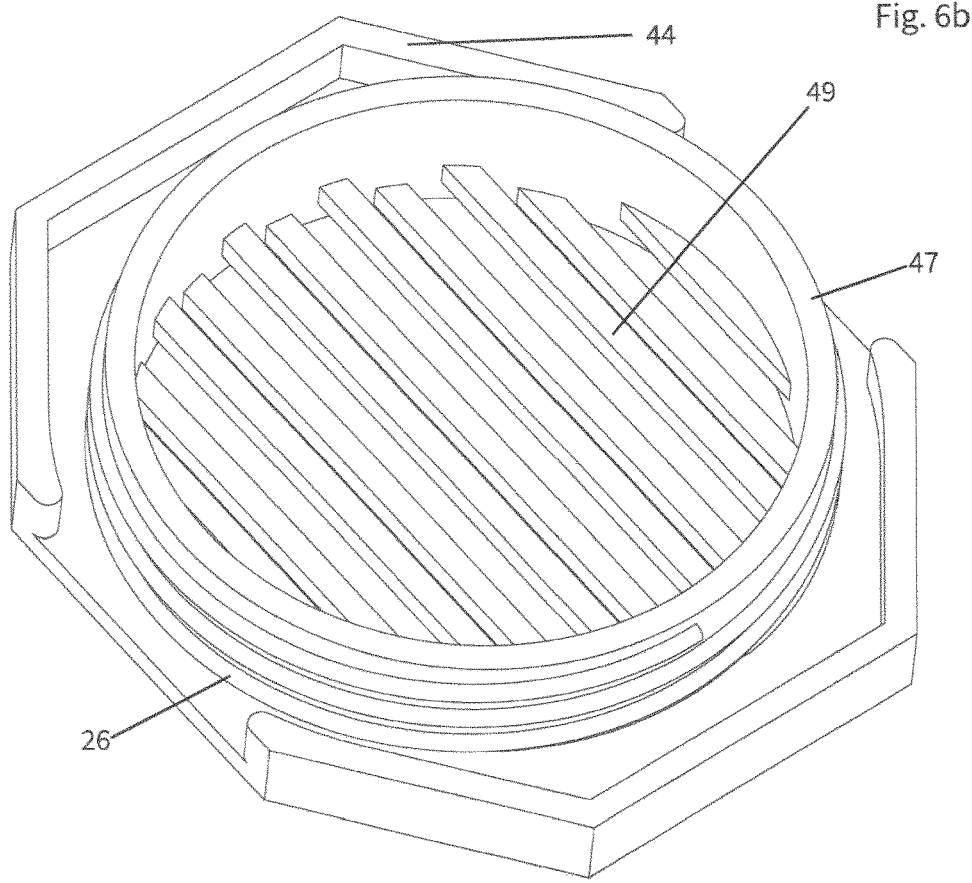

FIG. 6b depict the same embodiment as in FIG. 6a, however in a perspective aspect of the filter 45 with the ribs 49.

The elements comprising the container 20, the container lid 40 and the filter 45 can form a container assembly 15.

The elements comprising the frame 30, the frame lid 32 and the filter 45 may form a biopsy cassette 18.

The elements comprising the container 20, the frame 30, the frame lid 32, the container lid 40 and the filter 45 can form a pathology assembly 10.

The invention claimed is:

1. A filter of a pathology assembly comprising
   a first side that is configured to facilitate the outflow of a fluid, wherein the fluid comprises a fixating, conserving, and/or nurturing liquid and/or gas, the first side being configured to withhold a specimen and to facilitate an automated recognition and analysis of the specimen;
   a ridge comprising a filter closing element; and
   a second side opposing the first side comprising: a supporting structure and a first member that forms a first seal,
   wherein the first side is configured to support an automated specimen recognition and analysis and wherein the first side comprises ribs, wherein the ribs are configured to support the specimen and to reduce a surface tension of the fixating, conserving, and/or nurturing liquid and/or gas,
   wherein the first side is shallow enough to provide accessibility and a clear view to an optical component onto the specimen to provide automated specimen recognition and analysis.

2. The filter according to claim 1, wherein the first side comprises at least one pore configured to facilitate the outflow, wherein a pore clearance is between 1 μm and 5 mm.

3. The filter according to claim 2, wherein the pore clearance is between 10 μm and 1 mm.

4. The filter according to claim 2, wherein the pore clearance is between 500 μm and 1 mm.

5. The filter according to claim 1, wherein the filter closing element is formed as a positively engaging element and the ridge further comprises a ridge member that forms a second seal configured to form a connection with a container.

6. The filter according to claim 5, wherein the first side comprises a section with an angle of at least 90° and at most 180° between the section and the ridge to form a rounded and/or a chamfered surface.

7. The filter according to claim 5, wherein the filter closing element is configured to engage with the container in a releasable manner.

8. The filter according to claim 5, wherein the filter closing element is configured to provide a positive and/or frictional locking engagement.

9. The filter according to claim 5, wherein the filter closing element is configured to engage with the container by a machine-releasable attachment.

10. The filter according to claim 1, further comprising an identifier that is machine readable and/or writable.

11. The filter according to claim 1, wherein the filter is configured to connect to a container lid, wherein the container lid comprises a locking clip, and further comprising a second member for the first seal configured to form a releasable connection to the filter in which the container lid is in firm abutment with the filter.

12. A system comprising:
   a container configured to connect to a filter, comprising:
      a cavity configured to receive a specimen, and/or a fluid, wherein the fluid comprises a fixating, conserving, and/or nurturing liquid and/or gas;
      a defined region configured to hold an information field for identification or automation;
      a gripping range configured to facilitate a dismantling process; and
      a second member of a second seal that forms a connection between an assembly of the filter, a container lid, and the container,
   wherein the filter comprises a first side that is configured to support an automated specimen recognition and analysis and wherein the first side comprises ribs, wherein the ribs are configured to support the specimen and to reduce a surface tension of the fixating, conserving, and/or nurturing liquid and/or gas, wherein the first side is shallow enough to provide accessibility and a clear view to an optical component onto the specimen to provide automated specimen recognition and analysis.

13. The system according to claim 12, wherein the filter comprises:
   the first side that is configured to facilitate the outflow of the fluid, the first side being configured to withhold a specimen;
   a ridge comprising a filter closing element; and
   a second side opposing the first side comprising: a supporting structure and a first member that forms a first seal.

14. The system according to claim 12, wherein the defined region comprises a field configured to provide a machine-readable identifier related to the specimen, the fluid housed by the container, hazard information related to the fluid and/or the specimen, and/or an originator of the specimen.

15. The system according to claim 12, further comprising a frame configured to connect to the filter, wherein the frame comprises a frame closure that complements the filter closing element and further comprises an identifier readable by a human and/or a machine,
   wherein the identifier is configured to be machine-writable.

16. The system according to claim 15, further comprising a filter lid.

17. The system according to claim 12, further comprising a container lid configured to connect to the filter, wherein the container lid comprises a locking clip, and further comprising a second member for the first seal configured to form a releasable connection to the filter in which the container lid is in firm abutment with the filter,
   wherein the container lid and/or the filter are fluid tight when connected to the container in a closed position.

\* \* \* \* \*